US008985467B2

(12) United States Patent
Mingle et al.

(10) Patent No.: US 8,985,467 B2
(45) Date of Patent: Mar. 24, 2015

(54) PERMANENTLY DEACTIVATABLE SECURITY TAG

(71) Applicant: Checkpoint Systems, Inc., Thorofare, NJ (US)

(72) Inventors: John B. Mingle, Sicklerville, NJ (US); Lawrence Appalucci, Villanova, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 84 days.

(21) Appl. No.: 13/738,475

(22) Filed: Jan. 10, 2013

(65) Prior Publication Data

US 2013/0193215 A1 Aug. 1, 2013

Related U.S. Application Data

(60) Provisional application No. 61/593,489, filed on Feb. 1, 2012.

(51) Int. Cl.
*G06K 7/08* (2006.01)
*G06K 19/06* (2006.01)
*G08B 13/24* (2006.01)

(52) U.S. Cl.
CPC .......... *G08B 13/2437* (2013.01); *G08B 13/244* (2013.01); *G08B 13/242* (2013.01)
USPC ..... 235/492; 235/451; 340/572.1; 340/572.5; 340/572.7

(58) Field of Classification Search
USPC ............... 235/452, 488, 492, 451; 340/572.1, 340/572.5, 572.7
See application file for complete search history.

(56) References Cited

U.S. PATENT DOCUMENTS

| | | | | |
|---|---|---|---|---|
| 3,913,219 | A | 10/1975 | Lichtblau | |
| 5,012,225 | A * | 4/1991 | Gill | 340/572.3 |
| 5,182,544 | A * | 1/1993 | Aquilera et al. | 340/572.5 |
| 5,276,431 | A | 1/1994 | Piccoli et al. | |
| 5,510,770 | A * | 4/1996 | Rhoads | 340/572.3 |
| 5,574,431 | A * | 11/1996 | McKeown et al. | 340/572.3 |
| 5,582,924 | A * | 12/1996 | Davies | 428/611 |
| 5,841,350 | A * | 11/1998 | Appalucci et al. | 340/572.3 |
| 6,091,607 | A * | 7/2000 | McKeown et al. | 361/777 |
| 6,400,271 | B1 * | 6/2002 | Davies et al. | 340/572.1 |
| 6,489,891 | B1 * | 12/2002 | Ho et al. | 340/572.3 |
| 6,919,806 | B2 * | 7/2005 | Narlow et al. | 340/572.1 |
| 7,330,116 | B2 | 2/2008 | Prat et al. | |
| 8,125,341 | B2 | 2/2012 | Strauser et al. | |
| 2002/0171548 | A1 * | 11/2002 | Ho et al. | 340/572.3 |
| 2003/0020612 | A1 * | 1/2003 | Lian et al. | 340/572.6 |

FOREIGN PATENT DOCUMENTS

EP 0762353 A1 3/1997

* cited by examiner

*Primary Examiner* — Tuyen K Vo
(74) *Attorney, Agent, or Firm* — Richard A. Howe, II

(57) ABSTRACT

A permanently deactivatable security tag and method to create a permanently deactivatable security tag to eliminate tag pollution caused by reactivated tags reentering a store premises and setting off false alarms. The security tag includes a frangible conductive portion that fractures due to stress applied on the frangible conductive portion from a hardened substrate located on the tag. The hardened substrate induces stress to the frangible conductive portion located adjacent to the edge of the hardened substrate as the tag is flexed and bent. The fracture of the frangible conductive portion of the tag results in a shifting and/or disabling of the predetermined frequency of the security tag.

19 Claims, 6 Drawing Sheets

PERMANENTLY DEACTIVATABLE SECURITY TAG

CROSS-REFERENCE TO RELATED APPLICATION

This application claims the benefit under 35 U.S.C. §119 (e) of the earlier fling date of U.S. Provisional Application Ser. No. 61/593,489 filed on Feb. 1, 2012, the entire disclosure of which is hereby incorporated by reference herein as if being set forth in its entirety.

BACKGROUND

The present disclosure relates to a security tag and method for creating a security tag that permanently deactivates. The permanently deactivatable security tag eliminates false alarms causing tag pollution from occurring in retail stores.

Electronic article surveillance (EAS) includes the tracking and/or detecting the presence or removal of retail items from either inventory or a retail establishment. EAS is achieved by applying, an EAS element, as part of a security tag, to the item or its packaging and when the security tags are exposed to a predetermined electromagnetic field (e.g. pedestals and/or gate located at a retail establishment exit), they activate to provide some type of alert and/or supply data to a receiver or other detector. The security tag works primarily with radio frequency (RF) electromagnetic field disturbance sensing electronic security systems.

EAS soft labels are often introduced and applied to clothing. The FAS soft label typically includes a resonant circuit with as coil coupled to a capacitor. The EAS security element is tuned to a predetermined frequency and if one attempts to remove a garment, containing, the soft label on or within, from a store, an alarm triggers as the tag passes through a surveillance field created by a transmitter, located between pedestals at the store exit, tuned to the same frequency. The alarm goes off as the EAS element resonates, providing an output signal detected by a receiver, also located in the pedestals.

When a customer purchases a garment, comprising the soft label, the soft label is deactivated at the retail counter, before the EAS tag moves through the pedestals, so as not to set off the alarm. Deactivation occurs by inducing voltage to the tag from a deactivation device so as to change and/or destroy the detection frequency resonance, such that the security tag is no longer detected as an active security tag by the security system. The voltage applied from the deactivation device induces a short about a preferred area of the capacitor plates in the EAS circuit. This in turn short's the tag's resonant circuit. As an example, tags may include a weak link created by forming a dimple in the tag which brings more closely together capacitor plates formed by the metallization of two different parts of the tag's resonant circuit located on opposite sides of the tag substrate, thereby allowing electrical breakdown at moderate power levels. Such a breakdown causes a short circuit between the two capacitors. The shorted circuit deactivates the tag, allowing the customer to move through the alarm pedestals without setting off the alarm. However, the short in the tag may only be temporary.

Often, motion and contortion of the tag may physically open the short between the capacitor plates in the tag, resulting in a reactivated resonant security tag. Often, after sale, neither the retailer nor consumer removes the soft label from within the sold garment. This is usually due to installation by a manufacturer of the tag to a garment in either a hidden or hard-to-get-to location so that potential shoplifters won't seek out the tag and remove before passing through the alarm pedestals. Wearing the garment, and thus bending or flexing the garment at or around the location of the soft tag can break and open any shorts between the capacitor plates caused by deactivation. A garment, having a reactivated tag, presents a problem for retail stores, that being the same store in which the garment was purchased or other stores, because the alarm pedestals sense the reactivated tag when the garment is introduced into the store. These reactivated tags, located in formerly bought clothing causes various false alarms, resulting in tag pollution in the store. This results in confusion for retailers and retail security over the nature of the alarm.

What is needed is a permanently deactivatable security tag and method for constructing a permanently deactivatable security tag to eliminate tag pollution, caused by for example, the reactivation of EAS soft tags and their introduction into a store. A permanently deactivatable security tag would reduce the number of false alarms. Thus, retailers and retail security might then be confidently assured that an alarm event is due to a legitimate theft taking place. Also the permanently deactivatable security tag would allow for the continued neglect by consumers and retailers in having to find and remove soft tags from clothing after purchase.

SUMMARY

Embodiments of this disclosure provide a security tag and method for creating a security tag that permanently deactivates to reduce tag pollution.

Embodiments of this disclosure are directed to a permanently deactivatable security tag including at least one frangible conductive portion in a tag circuit on the security tag. The at least one frangible conductive portion fractures when stress is applied to the at least one frangible conductive portion. The tag circuit of the security tag resonates at a working frequency when the frangible conductive portion is not fractured.

According to one embodiment, the permanently deactivatable security tag further includes a hardened substrate located in proximity to the frangible conductive portion, wherein the hardened substrate induces stress on the at least one frangible conductive portion to fracture the at least one frangible conductive portion.

According to one embodiment, the at least one frangible conductive portion is part of a capacitor element of the tag circuit.

According to another embodiment, the permanently deactivatable security tag further includes a dielectric film layer. The tag also includes a first circuit. The first circuit includes a first conductive layer including, a coil portion and a first capacitor plate, formed on one side of said dielectric film layer. The tag also includes a second circuit. The second circuit includes a second conductive layer including a second capacitor plate, formed on the other side of said dielectric film layer. The tag also includes one or more separation portions located between at least one of said capacitor plates to separate the at least one of said capacitor plates into at least two capacitor plate pieces. The one or more separation portions are located over the dielectric film layer and are non-conductive. The at least one frangible conductive portions connect the capacitor plate pieces about the one or more separation portions. The first and second circuits electrically connect to form the tag circuit. The first capacitor plate and second capacitor plate form the capacitor element. According to one aspect of one embodiment, the tag circuit is a LC circuit.

According to one aspect of one embodiment, an edge of the hardened substrate is located adjacent to the at least one frangible conductive portion. The induced stress about the at least one frangible conductive portion is caused when the tag is flexed.

According to another embodiment, the hardened substrate is located over a dimple over either capacitor plate. The dimple includes a first indentation in the first capacitor plate located across the dielectric film layer from a second indentation in the second capacitor plate.

Embodiments of this disclosure are directed to a method for creating a permanently deactivating security tag including applying an at least one frangible conductive portion to a tag circuit in the security tag. The at least one frangible conductive portion fractures when stress is applied to the at least one frangible conductive portion. The tag circuit of the security tag resonates at a working frequency when the frangible conductive portion is not fractured.

According to one embodiment, the method thriller includes applying a substrate on the surface of the security tag. An edge of the substrate is located adjacent to the at least one frangible conductive portion. The method further includes hardening the substrate on the surface of the security tag to form a hardened substrate. The hardened substrate induces stress about the at least one frangible conductive portion when the tag is flexed so as to subsequently fracture the at least one frangible conductive portion.

According to one aspect of one embodiment, the substrate is selected from one of a rigid or a semi-rigid substrate. According to another aspect of one embodiment, the semi-rigid substrate comprises a flowable substrate.

According to another embodiment, hardening the flowable substrate includes varying a temperature of the flowable substrate or allowing for a sufficient amount of time to elapse.

According to another aspect of one embodiment, the method further includes positioning a first capacitor plate on one side of a dielectric film layer and positioning a second capacitor plate on the other side of the dielectric film layer. The first capacitor plate forms a first circuit comprising a first conductive layer having a coil. The second capacitor plate forms a second circuit comprising a second conductive layer. The first circuit and second circuit electrically connect to form the tag circuit. The method further includes separating the first capacitor plate and the second capacitor plate to form at least two capacitor plate pieces in each capacitor plate and to form one or more separation portions between the capacitor plate pieces in the capacitor plate. The one or more separation portions are located over the dielectric film layer and are non-conductive. Applying the at least one frangible conductive portion to the tag circuit in the security tag includes bridging the at least two capacitor plate pieces about the one or more separation portions.

According to another aspect of one embodiment, the tag circuit is a LC circuit.

According to another aspect of one embodiment, the method further includes indenting a first area of the first capacitor plate and a second area of the second capacitor plate. The method further includes positioning the indented first area and indented second area across from each other on opposite sides of the dielectric film layer to form a dimple. The indented first area and indented second area are closer to each other in the dielectric film layer than elsewhere between the first and second capacitor plates. The method further includes positioning the application of hardened substrate over the dimple on either capacitor plate.

BRIEF DESCRIPTION OF THE DRAWINGS

The foregoing and other aspects of this disclosure are best understood from the following detailed description when read in connection with the accompanying drawings. For the purpose of illustrating this disclosure, there is shown in the drawings embodiments that are presently preferred, it being understood, however, that this disclosure is not limited to the specific instrumentalities disclosed. Included in the drawings are the following Figures.

DETAILED DESCRIPTION OF ILLUSTRATIVE EMBODIMENTS

This document describes a permanently deactivatable security tag and method to create the same, for application in or on retail product, such as clothing, so as to reduce the occurrence of false alarms and ultimately eliminate tag pollution at retail stores. The permanently deactivatable security tag has a resonant circuit for use in an electronic security system (e.g. alarm pedestals), wherein the security tag may be detected at a frequency within a surveyed area utilizing electromagnetic energy having a predetermined detection frequency range. The security tag includes a frangible conductive portion, located on the tag, and within the resonant circuit. Frangible is herein defined as breakable or inclined to break. A hardened substrate is also located on the security tag and in proximity to the frangible conductive portion. A fracture is induced in the frangible conductive portion after a time that the garment has been worn, washed, dried, folded, stored, and/or ironed. The fracture occurs due to the concentration of stress placed on the frangible conductive portion by the hardened substrate in proximity. As the garment is used, including, worn, the tag bends and flexes. The tag under the hardened substrate remains stiff and fixed. Stress is applied to portions of the tag near the edges of the hardened substrate, including the frangible conductive portion. The fracture created in the frangible conductive portion disables the resonant circuit on the tag, causing an electrical open circuit so that the tag does not resonate at a working frequency to set off an alarm.

Figure 1A:
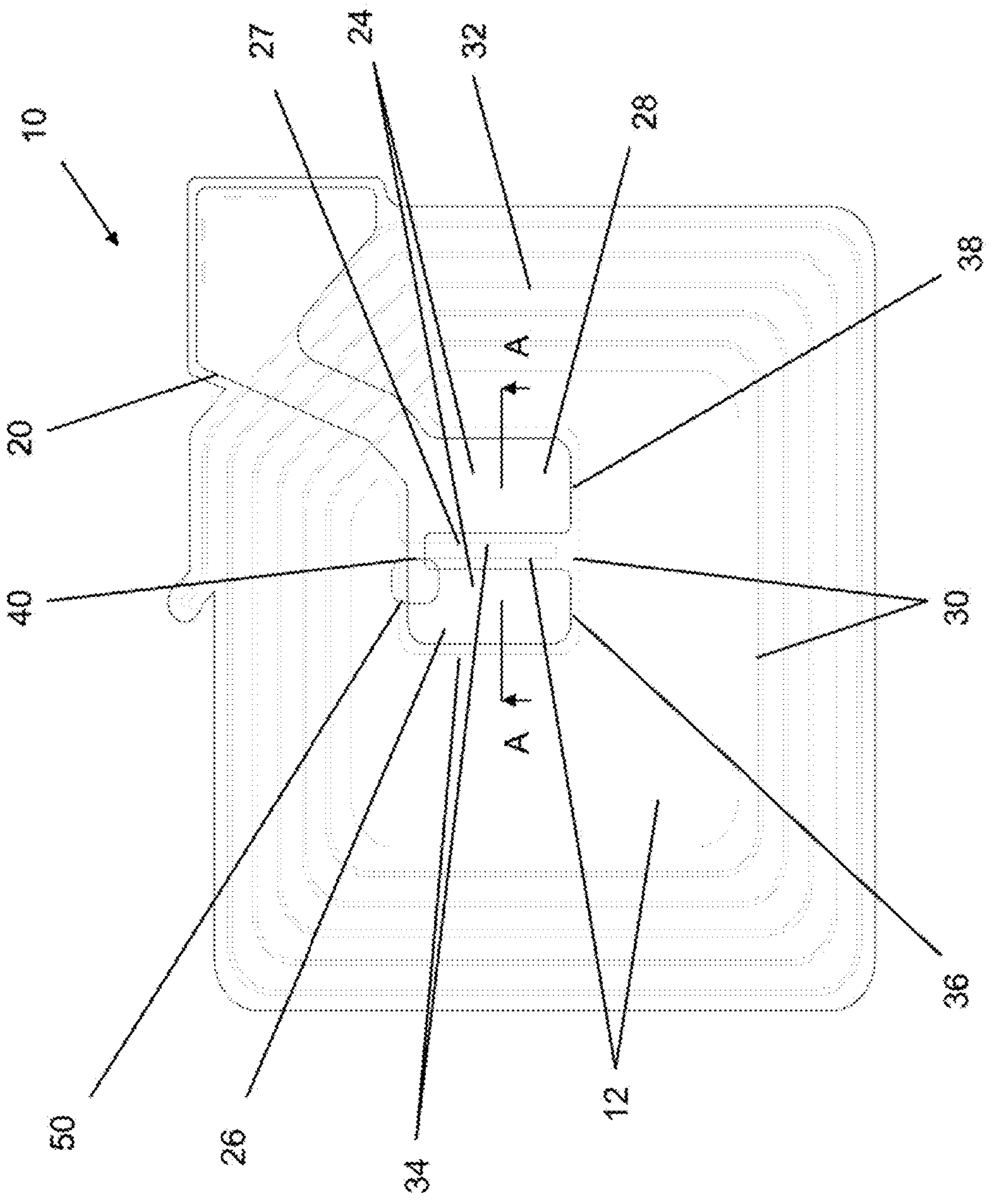
FIG. 1A illustrates an enlarged plan view of the security tag shown as transparent, through the dielectric film layer, so as to show both the top-side circuit layer and coil-side circuit layer according to one embodiment.
Figure 1B:
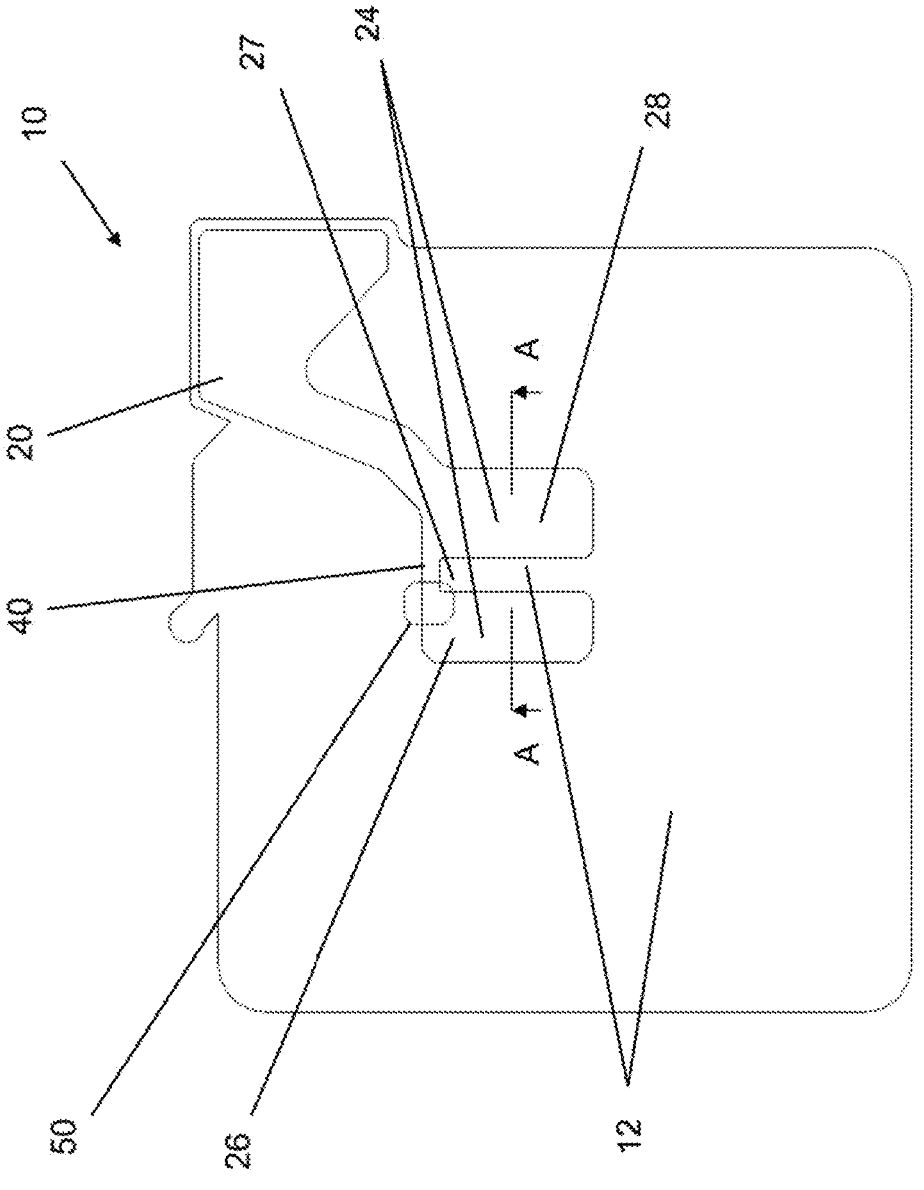
FIG. 1B illustrates the security tag of 1A showing the top-side circuit layer according to one embodiment.
Figure 1C:
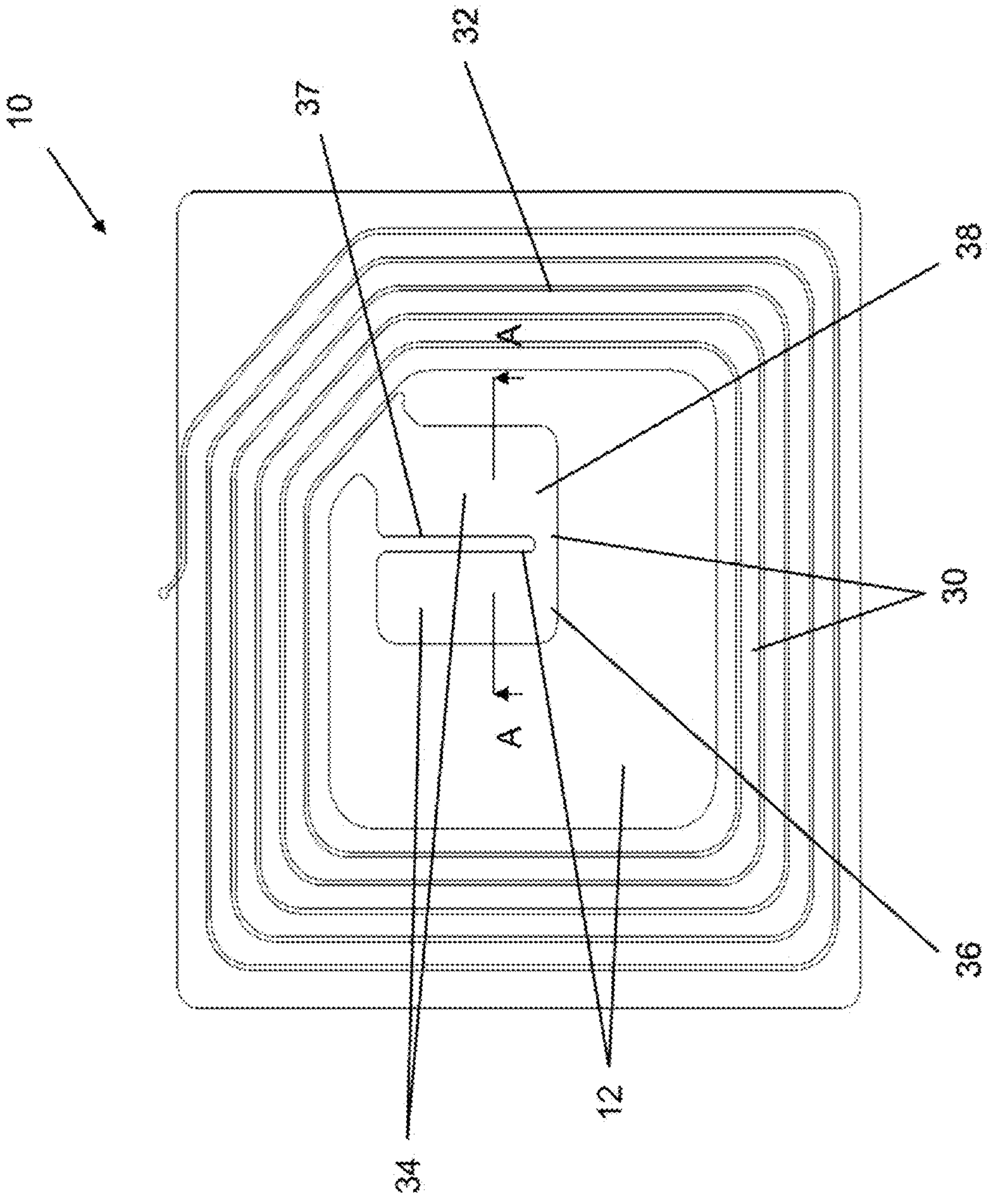
FIG. 1C illustrates the security tag of 1A showing the coil-side circuit layer according to one embodiment.

FIG. 1A illustrates an enlarged plan view of the security tag 10. In FIG. 1A, the security tag 10 is shown as transparent, through the dielectric filial layer 12, so as to show both the top-side circuit layer 20 and coil-side circuit layer 30, each affixed to a side of the dielectric film layer 12. FIG. 1B illustrates the security tag 10 of 1A showing the top-side circuit layer 20 and FIG. 1C illustrates the security tag 10 of 1A showing the coil-side circuit layer 30. The top-side circuit layer 20 is shown in foreground and the coil-side circuit layer 30 is shown in the background of the dielectric film layer 12, as shown in FIG. 1A. Shown in the foreground of the dielectric film layer 12, and over a part of the top-side circuit layer 20, is the hardened substrate 50. The hardened substrate 50 is shown as transparent. In some embodiments, the substrate 50 may be transparent or opaque. The hardened substrate 50 may be positioned approximate to a frangible conductive portion. In the preferred embodiment, the frangible conductive portion is a bridge 40.

As shown in FIG. 1A through 1C, the security tag 10 generally includes a square, planar insulative or dielectric substrate, referred herein after as the dielectric film layer 12. The material in the dielectric film layer 12 may be a solid material or composite structure of materials making it insulative. The dielectric film layer 12 may be for example, polyethylene.

The circuitry on the tag forms at least one resonant circuit. The circuitry is formed on the dielectric film layer 12 by patterning conductive material. As shown in FIG. 1A, a top-side circuit layer 20 is formed on one side of the dielectric film layer 12, in the foreground (see also FIG. 1B), and a coil-side circuit layer 30 is formed on the opposite side of the dielectric film layer 12, in the background (see also FIG. 1C). The coil-side circuit layer 30 is formed of a conductive pattern which includes a coil 32 and coil-side capacitor plate 34. The top-side circuit layer 20 is formed of a conductive pattern which includes a top-side capacitor plate 24.

The conductive patterns of the circuit layers may be formed on the dielectric film layer 12, respectively, with electrically conductive materials of a known type and in a manner which is well known in the electronic article surveillance art. The conductive material is preferably patterned by a subtractive process (i.e., etching), whereby unwanted material is removed by chemical attack after desired material has been protected, typically with a printed on etch resistant ink. In the preferred embodiment, the conductive material is aluminum. However, other conductive materials (e.g., gold, nickel, copper, phosphor bronzes, brasses, solders, high density graphite or silver-filled conductive epoxies) can be substituted for aluminum without changing the nature of the resonant circuit or its operation.

The tag may be manufactured by processes described in U.S. Pat. No. 3,913,219 entitled "Planar Circuit Fabrication Process", which is incorporated herein by reference. However other manufacturing processes can be used, and nearly any method or process of manufacturing circuit boards could be used to make the tag.

The top-side circuit layer 20 and coil-side circuit layer 30 establish at least one resonant circuit having a resonant frequency within the predetermined detection frequency range of an electronic article surveillance system used with the security tag 10. In the preferred embodiment, the resonant circuit is formed by the combination of a single inductive element L, inductor coil electrically connected with a single capacitive element or capacitance C.sub.1 in a series loop, as shown and described in U.S. Pat. No. 5,276,431, which is hereby incorporated by reference and which is assigned to Checkpoint Systems, Inc. The inductive element L is formed by a coil 32 of the conductive pattern in the coil-side circuit layer 30 and the capacitive element C.sub.1, which is partly formed by the coil-side capacitor plate 34. The coil-side capacitor plate 34 is generally a rectangular land portion. Top-side capacitor plate 24 is generally aligned over the coil-side capacitor plate 34 on the other side of the dielectric film layer 12. The coil-side capacitor plate 34 is also generally rectangular. The conductive land portions of the coil-side capacitor plate 34 and top-side capacitor plate 24 are separated by the dielectric film layer 12 and form the capacitor element C.sub.1.

The inductive element L is formed as a spiral coil 32 of conductive material on the coil-side circuit layer 30. The coil-side capacitor plate 34 of the capacitor element C.sub.1, is electrically connected to one end of the inductor coil 32. Similarly, the top-side capacitor plate 24 of the capacitor element C.sub.1, is electrically connected by a weld connection (not shown) extending through the dielectric film layer 12 to the other end of the inductor coil 32, thereby connecting the inductive element L to the capacitor element C.sub.1 in series in a well known manner.

Although the tag 10 includes a single inductive element L and a single capacitor element C.sub.1 multiple inductor and capacitor elements may alternatively be employed. For instance, multiple element resonant circuits are well known in the electronic security and surveillance art. The construction of these resonant circuits can be altered through the use of remote electronic devices. Such circuit alteration may occur, for example, at a manufacturing facility or at a checkout counter when as person purchases an article with an affixed or embedded security tag 10, depending upon the intended use of the tag 10. Deactivation of the tag 10, which typically occurs at the point of sale, prevents the resonant circuit from resonating so that the electronic security system no longer detects when the article passes through the surveillance zone of the electronic security system. Frequency shilling, which typically occurs at the manufacturing facility changes the frequency at which the resonant circuit resonates.

Figure 2A:
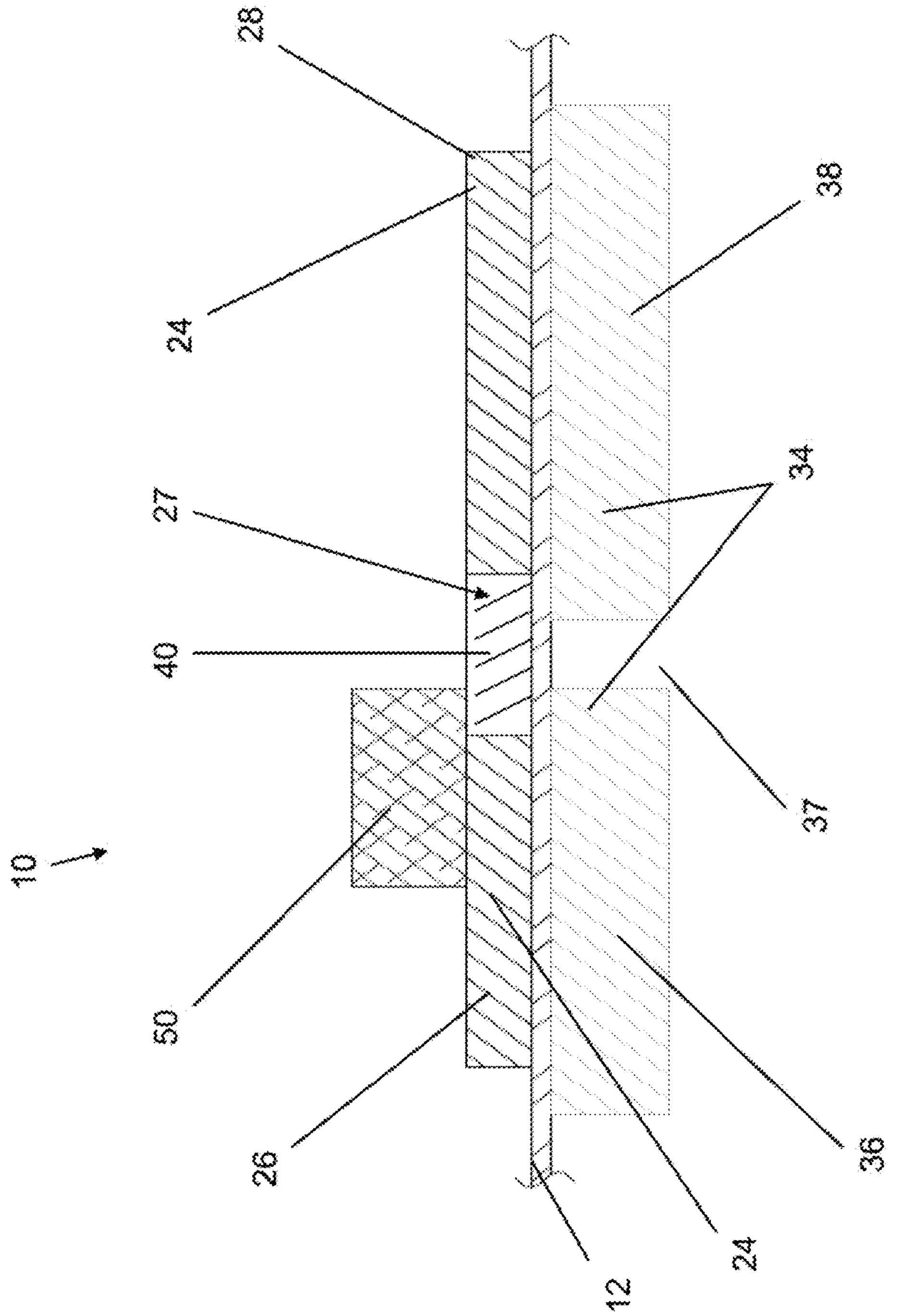
FIG. 2A illustrates a diagrammatic cross-sectional view of the security tag taken along line A-A in FIG. 1, showing both the top-side capacitor plate and coil-side capacitor plate according to one embodiment.
Figure 2B:
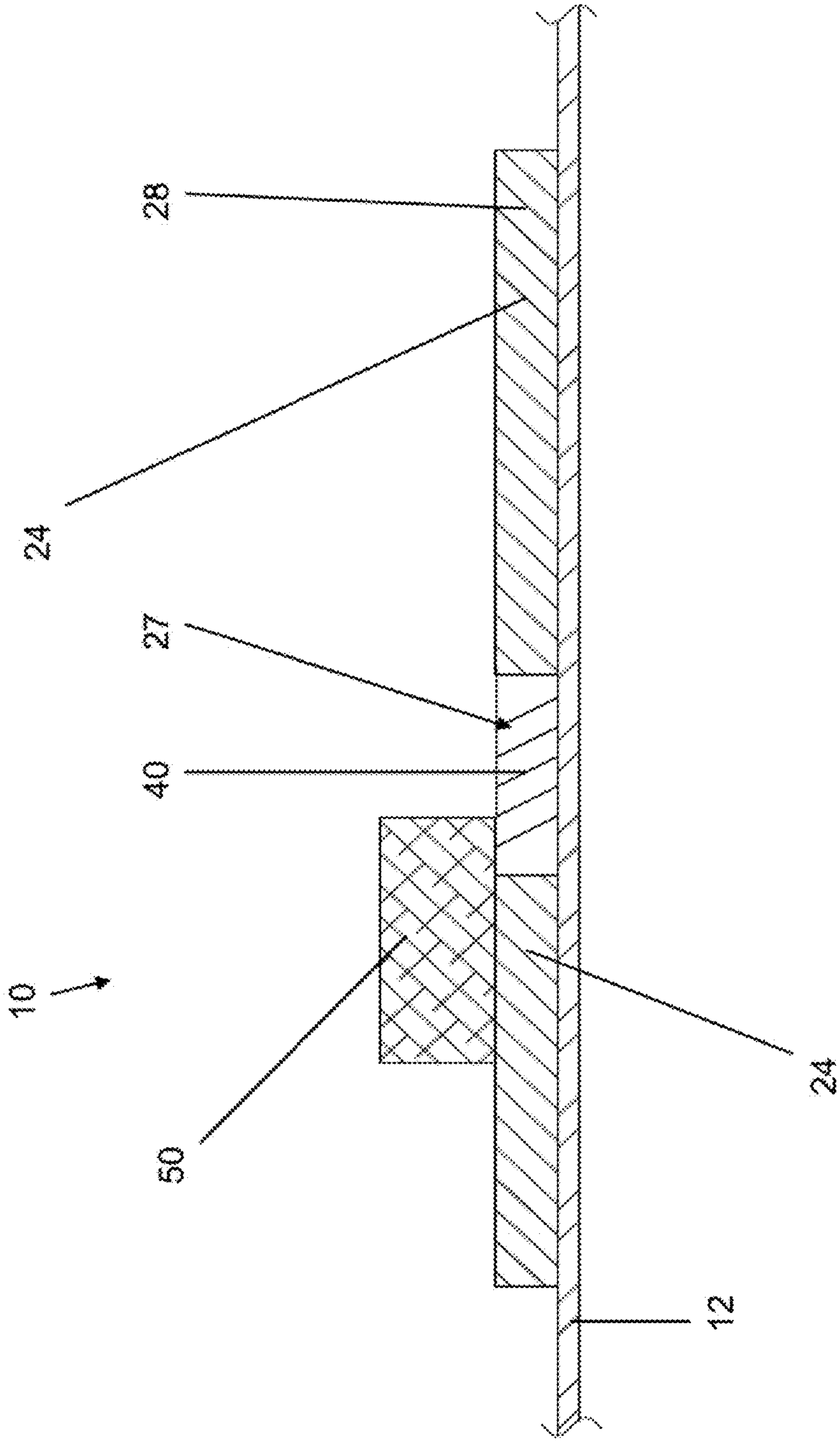
FIG. 2B illustrates a diagrammatic cross-sectional view of the security tag taken along line A-A in FIG. 1, showing the top-side capacitor plate.
Figure 2C:
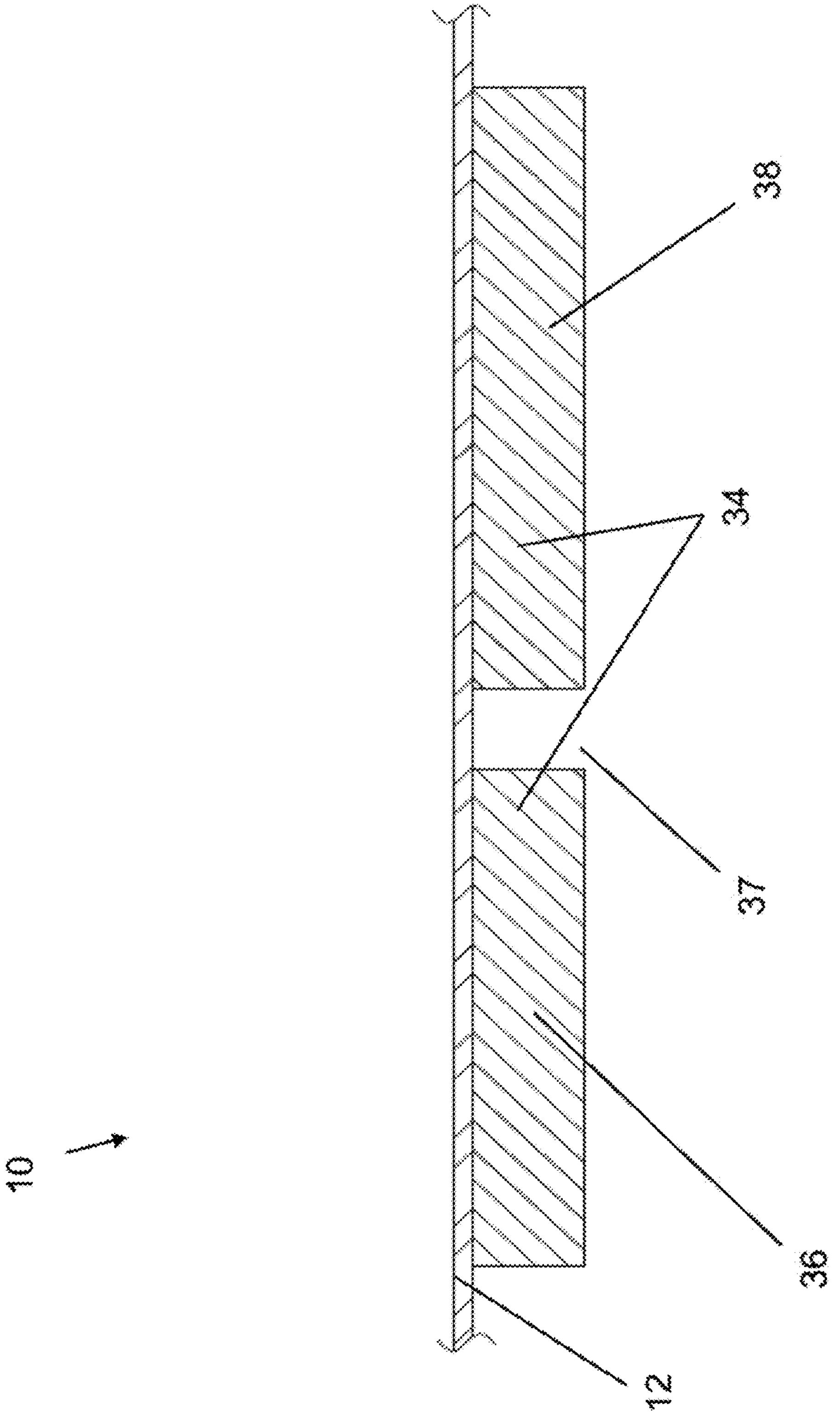
FIG. 2C illustrates a diagrammatic cross-sectional view of the security tag taken along line A-A in FIG. 1, showing the coil-side capacitor plate according to one embodiment.

FIG. 2A illustrates a diagrammatic cross-sectional view of the security tag 10 taken along line A-A in FIG. 1A. FIG. 2B illustrates the diagrammatic cross-sectional view of FIG. 2A showing the top-side capacitor plate 24 above the dielectric film layer 12. FIG. 2C illustrates the diagrammatic cross-sectional view of FIG. 2A showing the coil-side capacitor plate 34 below the dielectric film layer 12. As shown in FIG. 2A, the coil-side capacitor plate 34 may be thicker than the top-side capacitor plate 24. As shown in FIGS. 2A and 2C, it is preferred that the coil-side capacitor plate 34 includes a coil-side plate separation 37. The coil-side plate separation 37 generally splits the coil-side capacitor plate 34 into a first coil-side capacitor plate piece 36 and second coil-side capacitor plate piece 38. Top-side capacitor plate 24 also includes a top-side plate separation 27. The top-side plate separation 27 generally splits the top-side capacitor plate 24 into a first top-side capacitor plate piece 26 and second top-side capacitor plate piece 28. As shown in FIG. 1A and FIG. 2A, top-side plate separation 27 is aligned directly over coil side plate separation 37, with the dielectric film layer 12 imposed between the two separations 27, 37. Each separation is a gap, wherein the capacitor is not present over the dielectric film layer 12. In other embodiments, more than one separation in the capacitor plate ma exist such that more than two capitor plate pieces exist per capacitor plate.

As shown in FIG. 1A and FIG. 2A, a conductive bridge 40 crosses over the dielectric film layer 12 to connect the first top-side capacitor plate piece 26 with the second top-side capacitor plate piece 28. The bridge 40 may be a part of the capacitor element, as shown in FIG. 2A and FIG. 2B, and is located in the background behind the top-side plate separation 27 shown in the foreground, between the first top-side capacitor plate piece 26 and second top-side capacitor plate piece 28, both running from foreground to background, where they connect at bridge 40. The bridge 40 is conductive and is the thinnest connection point between the top-side capacitor plate pieces 26, 28. In the preferred embodiment, the bridge 40 is made of aluminum. Other materials known in the art, such as copper, may also be used to form the bridge 40. The bridge 40 is a weak connecting bridge between the first top-side capacitor plate piece 26 and the second top-side capacitor plate piece 28. Connection of the coil-side capacitor plate pieces 36, 38 is not shown in FIG. 2A or FIG. 2C since it is in the foreground of line A-A, but is shown in FIG. 1A and FIG. 1C.

As shown in both FIG. 1A and FIG. 2A, a hardened substrate 50 may be located on the first top-side capacitor plate 26 and in proximity to the top-side plate separation 27. An edge of the hardened substrate 50 may be located adjacent to the bridge 40, but not on the bridge 40. The hardened substrate 50 may be the result of applying either a rigid or semi-rigid substrate onto the surface of the tag 10. A semi-rigid substrate may be a flowable substrate. The flowable substrate may harden due to application of cold or hot temperatures or after a certain amount of time elapses. The substrate may be formed by epoxy, phenolic pieces, or any other substance that may create a hardened or fixed location on the tag 10. In other embodiments the hardened substrate may be any liquid or gel, that solidifies, such as a mound of liquid adhesive.

The hardened substrate 50 keeps the circuitry of the tag, and tag 50 itself, located under the hardened substrate 50 stiff or non-flexing. The hardened substrate 50 adds stress on the bridge 40, adjacent to the edge of the hardened substrate 50, whenever the tag 10 is flexed, bent, or otherwise contorted. After a time, this stress results in a fracturing of the bridge 40, the frangible conductive portion of the circuit in the tag 10, which in turn causes the capacitance value of the circuitry to alter.

In, for example, a tag 10 having a working frequency of 8.2 MHz, the tag 10 is detected without deactivation through a pair of readers with a reader detection range of typically 8.2 MHz+−5%, approximately 7.8 MHz to 8.6 MHz. Fracturing of a bridge 40 on this type of tag 10 can shift the frequency outside the range of detection of the RF bandwidth of the gate/pedestal detection system, as for example greater than 8.6 MHz or less than 7.8 MHz.

The hardened substrate 50, in conjunction with the bridge 40, results in a deactivation of the circuit after the point of sale. The wear and use of the garment by a customer after sale focuses the stress about the edges of the hardened substrate 50 as the tag 10, still embedded in the garment, is bent and flexed within.

In another embodiment, the bridge 40, or other frangible conductive portion, may be positioned adjacent to the hardened substrate 50, wherein the hardened substrate 50 may be located over indented areas in the capacitor plates, called dimples (not shown). The indented area in one capacitor plate is positioned over another indented area in the capacitor plate on the opposite side of the dielectric film layer 12, thus closing the gap or space between the two plates at that location, and thus thinning the dielectric film layer 12 there. Applying reinforcement material directly over a dimple in the capitor plate is shown and described in U.S. Pat. No. 8,125,341 which is hereby incorporated by reference and which is assigned to Checkpoint Systems, Inc. In U.S. Pat. No. 8,125,341, reinforcement material is applied over the dimple to protect a short in the capacitor plates formed between the indented capacitor plates at deactivation. Often with bending and flexing of the tag 10, the electrical short formed across the dielectric film layer 12 is removed, thus reactivating the tag 10. The reinforcement material protects the short.

In the alternative embodiment, if the reinforcement material, or hardened substrate 50, applied over the dimple, is located adjacent to a frangible conductive portion, such as a bridge 40 connecting the capacitor plates, then the hardened substrate 50 not only protects the short in the dimple, but applies stress about the bridge 40 to eventually open the electric connection about the bridge 40 and permanently deactivate the circuit in the tag 10.

In another embodiment, the frangible conductive portion may be located elsewhere within either of the circuit layers, such that a fracture of the frangible conductive portion impacts the predetermined resonant frequency of the security tag 10. More than one frangible conductive portion may also exist on the tag, which may or may not be a bridge. Multiple hardened substrates 50 may be located about each of the frangible conductive portions. In other embodiments, multiple frangible conductive portions may be located about the periphery edge of a single hardened substrate.

Although this disclosure has been described with reference to exemplary embodiments, it is not limited thereto. Those skilled in the art will appreciate that numerous changes and modifications may be made to the preferred embodiments and that such changes and modifications may be made without departing from the true spirit of this disclosure. It is therefore intended that the appended claims be construed to cover all such equivalent variations as fall within the true spirit and scope of this disclosure.

What is claimed is:

1. A security tag comprising:

a circuit including a coil and a capacitor plate;

a bridge portion;

at least two capacitor plate portions of the capacitor plate, wherein the bridge portion connects the at least two capacitor plate portions; and a hardened substrate, different from the bridge portion and applied proximate to the bridge portion, wherein the hardened substrate is configured to induce stress on the bridge portion to fracture the bridge portion, thereby permanently deactivating the security tag.

2. The security tag of claim 1, wherein the bridge portion is frangible and conductive.

3. The security tag of claim 2, wherein the hardened substrate is formed of epoxy or phenolic pieces.

4. The security tag of claim 1 further comprising:

a dielectric film layer, wherein the circuit is a first circuit formed on a first side of the dielectric film layer;

a second circuit including a second coil and a second capacitor plate, wherein the second circuit is formed on a second side of the dielectric film layer.

5. The security tag of claim 4, wherein the tag circuit is a LC circuit.

6. The security tag of claim 1, wherein the induced stress on the bridge portion is caused when the tag is flexed.

7. The security tag of claim 6, wherein the hardened substrate is located over a dimple over either the first capacitor plate or the second capacitor plate, wherein the dimple comprises a first indentation in the first capacitor plate located across the dielectric film layer from a second indentation in the second capacitor plate.

8. The security tag of claim 1, wherein the hardened substrate is selected from one of a rigid or a semi-rigid substrate.

9. The security tag of claim 8, wherein the semi-rigid substrate comprises a flowable substrate.

10. The security tag of claim 1, wherein fracturing the bridge portion causes the tag circuit of the security tag to no longer resonate at a working frequency.

11. A method for creating a security tag comprising:

providing a circuit including a coil and a capacitor plate;

providing a bridge portion;

connecting, via the bridge portion, at least two capacitor portions of the capacitor plate;

applying a hardened substrate proximate the bridge portion, wherein the hardened substrate is different than the bridge portion and configured to induce stress on the bridge portion to fracture the bridge portion, thereby permanently deactivating the security tag.

12. The method of claim 11, wherein the hardened substrate induces stress on the bridge portion when the tag is flexed.

13. The method of claim 12, wherein the hardened substrate is selected from one of a rigid or a semi-rigid substrate.

14. The method of claim 13, wherein the semi-rigid substrate comprises a flowable substrate.

15. The method of claim 14 wherein hardening the flowable substrate comprises varying a temperature of the flowable substrate or allowing for a sufficient amount of time to elapse.

16. The method of claim 12 further comprising:

positioning the capacitor plate on one side of a dielectric film layer and positioning a second capacitor plate of a second circuit on the other side of the dielectric film layer, wherein the second circuit comprises a second conductive layer having the second capacitor plate, and wherein the circuit and the second circuit electrically connect to form the tag circuit; and separating the capacitor plate and the second capacitor plate to form at least two capacitor plate pieces in each capacitor plate and to form one or more separation portions between the capacitor plate pieces in the capacitor plate; and wherein applying the bridge portion to the tag circuit in the security tag comprises bridging the capacitor plate and the second capacitor plate about the one or more separation portions with the bridge portion.

17. The method of claim 16, wherein the tag circuit is a LC circuit.

18. The method of claim 16 further comprising:

indenting a first area of the capacitor plate and a second area of the second capacitor plate;

positioning the indented first area and indented second area across from each other on opposite sides of the dielectric film layer to form a dimple, wherein the indented first area and indented second area are closer to each other in the dielectric film layer than elsewhere between the first and second capacitor plates; and positioning the application of hardened substrate over the dimple on either capacitor plate.

19. The method of claim 11, wherein fracturing the bridge portion causes the tag circuit of the security tag to no longer resonate at a working frequency.

* * * * *